United States Patent

Deaver et al.

[11] Patent Number: 5,876,146
[45] Date of Patent: Mar. 2, 1999

[54] APPARATUS AND METHODS FOR REPAIRING JET PUMP DIFFUSERS IN A NUCLEAR REACTOR

[75] Inventors: Gerald Alan Deaver, San Jose; James Walton Pyron, Redding; Anh Ngoc Nguyen, Milpitas, all of Calif.

[73] Assignee: General Electric Company, Schnectady, N.Y.

[21] Appl. No.: 549,132

[22] Filed: Oct. 27, 1995

[51] Int. Cl.⁶ .................................................. G21C 15/25
[52] U.S. Cl. .................................. 403/11; 403/14; 285/15
[58] Field of Search ................................ 285/27, 15, 415; 403/11, 13, 14

[56] References Cited

U.S. PATENT DOCUMENTS

| | | | |
|---|---|---|---|
| 406,888 | 7/1889 | Davis | 285/415 |
| 4,070,120 | 1/1978 | Bald et al. | 403/13 |
| 4,271,870 | 6/1981 | Butler et al. | 285/15 X |
| 4,635,970 | 1/1987 | Haines | 285/415 X |
| 4,680,166 | 7/1987 | Forster | 285/27 X |
| 4,765,660 | 8/1988 | Maier | 285/415 X |
| 5,314,215 | 5/1994 | Weinhold | 285/415 X |
| 5,402,570 | 4/1995 | Weems et al. | |
| 5,577,082 | 11/1996 | Weems et al. | |
| 5,600,689 | 2/1997 | Weems et al. | |

OTHER PUBLICATIONS

GE Nuclear Energy's *RFTD Refueling Floor Technical Director Training—vol. 1*, by Larry F. Karan and Michael D. Patch, Rev 1, 22 Aug. 1989.
Unilok Specification Sheet dated Oct. 24, 1991.

*Primary Examiner*—Anthony Knight
*Assistant Examiner*—John R. Cottingham
*Attorney, Agent, or Firm*—Armstrong, Teasdale, Schlafly & Davis

[57] ABSTRACT

Repair assemblies and methods for a jet pump diffuser in a nuclear reactor are described. In one particular embodiment, the diffuser has a substantially conical shape, and the larger diameter end of the diffuser is engaged to a shroud support plate of the reactor. The diffuser further has at least a first portion and a second portion welded together at a weld joint. The assembly, in one embodiment, includes a first c-ring having a first frusto-conical portion and a second substantially planar portion, and a second c-ring having a first frusto-conical portion and a second substantially planar portion. The first and second c-rings are configured, in the one embodiment, so that when the first and second c-rings are operatively positioned, first and second openings in the first c-ring are substantially aligned with first and second openings in the second c-ring, respectively.

9 Claims, 3 Drawing Sheets

APPARATUS AND METHODS FOR REPAIRING JET PUMP DIFFUSERS IN A NUCLEAR REACTOR

FIELD OF THE INVENTION

This invention relates generally to repairing jet pump diffusers in nuclear reactors and, more particularly, to apparatus and methods for providing vertical and lateral restraints for circumferential weld joints in the diffuser and adapter assemblies of a nuclear reactor.

BACKGROUND OF THE INVENTION

Jet pump diffusers in a nuclear reactor, such as in a boiling water nuclear reactor, typically form part of a jet pump and are utilized to maintain the floodability of the reactor core at a safe level. The jet pump diffuser also typically discharges water from an inlet mixer into the lower core plenum to maintain adequate recirculation flow.

One known jet pump diffuser has a generally conical shape, and the larger diameter end of the diffuser is welded to an adapter assembly engaged to an Inconel nickel-chromtun alloy shroud support plate. The smaller diameter end of the diffuser forms a slip fit connection to the inlet mixer section of the jet pump.

Water, generally under high pressure, flows through the jet pump diffuser from the smaller diameter end to the larger diameter end. The water exits the diffuser at the larger diameter end and is discharged through the adapter assembly into the lower core plenum. The discharged water mixes with the water in the lower core plenum and may cycle through the reactor.

As the water flows through the jet pump diffuser, the speed and pressure of the water decrease due to the increasing diameter of the diffuser. Decreasing the water speed and pressure just prior to being discharged into the lower core plenum improves the mixing and flow characteristics of the discharged water.

Of course, the integrity of the welds in the jet diffuser and adapter assembly is important. A crack or corrosion in such a weld, for example, if unrepaired, could result in reduced jet pump flow. Therefore, jet pump welds may be inspected during reactor shutdown to ensure the integrity of such welds.

In the event that crack indications are ever found in such a weld, the repair assembly preferably will locally retain the region of the crack to provide the support necessary to maintain the diffuser and adapter assembly secure during all possible operating conditions, including accident events. For example, during a seismic event, vertical and horizontal motions may be generated and transmitted throughout the reactor vessel structure including the jet pump assemblies. The repair assembly preferably should be able to withstand such vertical and horizontal motions and retain the diffuser and the adapter assembly in an operative position. Further, the repair assembly preferably would provide such necessary retention and support even for a complete circumferential crack in the weld joint. In addition, the repair assembly preferably could be installed without having to remove any components of the jet pump, e.g., the inlet mixer. If components of the jet pump have to be removed, such component removal would increase the repair costs and time required to perform the repair.

SUMMARY OF THE INVENTION

These and other objects are attained by a repair assembly which, in one embodiment, includes first and second c-rings. Both c-rings include a frusto-conical portion and a substantially planar portion. The slope of the frusto-conical portions is about approximately equal to the slope of the conical portion of the diffuser 50.

First and second c-rings are configured so that when they are operatively positioned on the diffuser, openings in the respective c-rings are substantially aligned and the interior surfaces of the frusto-conical portions are substantially adjacent the exterior surface of the conical portion of the diffuser. Since the slopes of the conical portions are about equal to the slope of diffuser, and since the diameter of such portions is selected to about equal the diameter of the lower section of the diffuser at selected contact locations between the diffuser and the c-rings, an interference or geometric fit is formed between the diffuser and the c-rings.

The repair assembly further includes, in the one embodiment, threaded holdown studs and threaded couplings. The holdown studs extend through aligned openings in the c-rings, and threaded nuts are threadedly engaged to the respective threaded studs. The assembly also includes lateral support brackets having first and second substantially cylindrical guide pipes and a segmented circular plate. Each guide pipe has one end adjacent a respective threaded coupling, and a respective holdown stud extends through a longitudinal bore in the guidepipe and into threaded engagement with a respective threaded coupling. Welded studs are each welded at one lend to the shroud support plate, and the ends of the studs opposite the shroud support plate are threadedly engaged to respective threaded couplings.

The repair assembly described above may be utilized, in the event that crack indications are ever found in a diffuser and adapter assembly weld, to locally retain the region of the crack and to provide the support necessary to maintain the diffuser and adapter assembly secure during operating conditions, including accident events. The assembly, more particularly, provides both vertical and horizontal support for motions which may be generated and transmitted throughout the reactor vessel structure including the jet pump assemblies. Further, the repair assembly preferably provides retention and support even for a complete circumferential crack in a weld joint, and may be installed without having to remove any components of the jet pump, e.g., the inlet mixer. In addition, the repair assembly also holds the diffuser in place to prevent leakage flow.

DETAILED DESCRIPTION OF THE DRAWINGS

Figure 1:
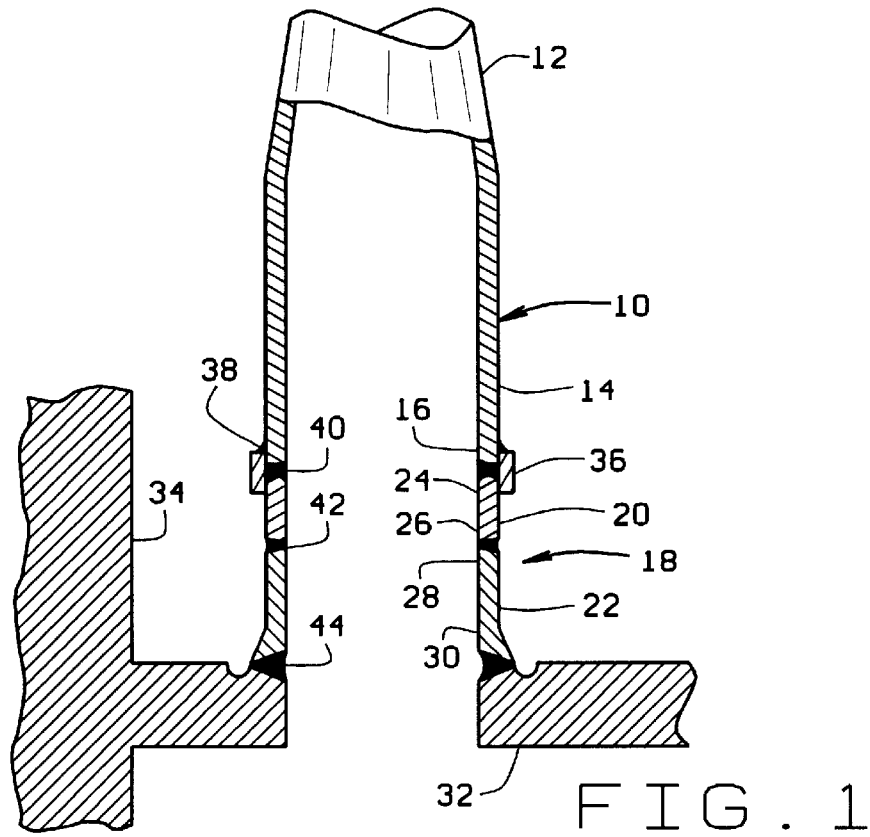
FIG. 1 is a cross sectional view of a known jet pump diffuser.

FIG. 1 is a cross sectional view of one known jet pump diffuser 10 which includes a conical section 12 and a cylindrical section 14. A larger diameter end 16 of diffuser 10 is welded to an adapter assembly 18 which includes a first adapter 20 and a second adapter 22. First adapter 20 is welded at one end 24 to end 16 of diffuser 10, and adapter 20 is welded at its other end 26 to one end 28 of second adaptor 22. Second adapter 22 is welded at its other end 30 to an Inconel nickel-chromtun alloy shroud support plate 32 which extends between a vessel wall 34 and a core shroud (not shown). The smaller diameter end (not shown) of diffuser 10 forms a slip fit connection to the inlet mixer section (not shown) of the jet pump. A backing ring 36 is shown as extending around the circumference of diffuser 10 and first adapter 20 at the weld location.

Diffuser 10 is constructed from 304 stainless steel. First adapter 20 is constructed from 304 stainless steel, and second adapter 22 is constructed from alloy 600. The various welds 38, 40, 42 and 44 maintain diffuser 10 and adapter assembly 18 in an operable position so that water may flow therethrough. Weld 38 is a continuous fillet weld. Welds 40 and 42 are V-groove type welds. The filler in weld 40 is E308 stainless steel weld filler material. Welds 42 and 44 are full penetration welds with alloy 182 weld filler material. Diffuser 10 is utilized, for example, in boiling water nuclear reactors generally referred to as General Electric Company BWR 3 and 4.

Figure 2:
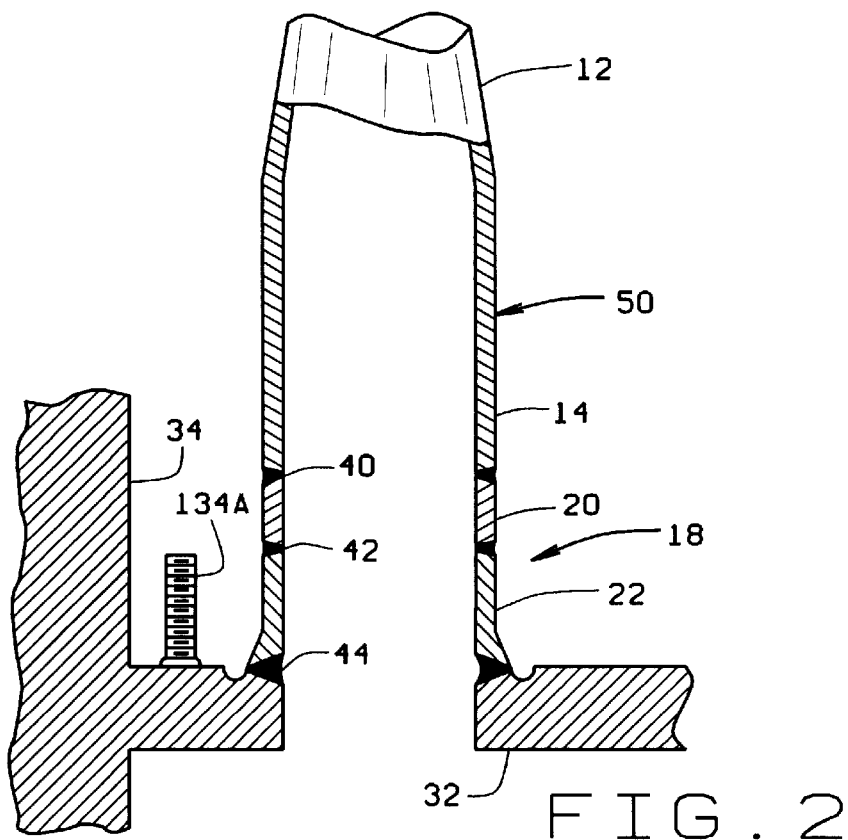
FIG. 2 is a cross sectional view of another known jet pump diffuser.

Another known diffuser 50 is shown in FIG. 2. Diffuser 50 is substantially similar to diffuser 10 shown in FIG. 1, and components and welds of diffuser 50 which are the same as the components and welds in diffuser 10 are designated in FIG. 2 using the same reference numerals as used in FIG. 1. No backing ring is utilized in diffuser 50. Diffuser 50 is utilized, for example, in the boiling water nuclear reactor generally referred to as the General Electric Company BWR 5 and 6.

With respect to both diffusers 10 and 50, and adapter assembly 18, the weld connections described above are important. For example, if a significant crack or corrosion were to form in one of the welds, jet pump flow could be reduced due to leakage flow through the crack. Such a condition is undesirable.

One embodiment of a repair assembly 100, which may be utilized if crack indications are ever found in one or more of the welds described above, is illustrated in FIG. 3. Assembly 100 is shown operatively positioned with respect to diffuser 50 and first and second adapters 20 and 22. Welds 40 and 42 are illustrated in hidden line. The components of assembly 100, unless otherwise specified herein, are manufactured from stainless steel.

Repair assembly 100 includes first and second c-rings 102 and 104. First, or upper, c-ring 102 includes a first frusto-conical portion 106 and a second substantially planar portion 108. A plane which extends parallel to the surface of planar portion 108 would be substantially perpendicular to the center axis of first c-ring 102, and the slope of the first frusto-conical portion 106 is about approximately equal to the slope of conical portion 12 of diffuser 50. Four openings, three shown as, 110A, 110B, and 110D, are formed in first c-ring 102.

Second c-ring 104 is substantially similar to first c-ring 102 in that second c-ring 104 has a first frusto-conical portion 112 and a second substantially planar portion 114. A plane which extends parallel to the surface of planar portion 114 would be substantially perpendicular to the center axis of second c-ring 104, and the slope of the first frusto-conical portion 112 is about approximately equal to the slope of conical portion 12 of diffuser 50. Four openings, three shown as, 116A, 116B, and 116D are formed in second c-ring 104.

Figure 3:
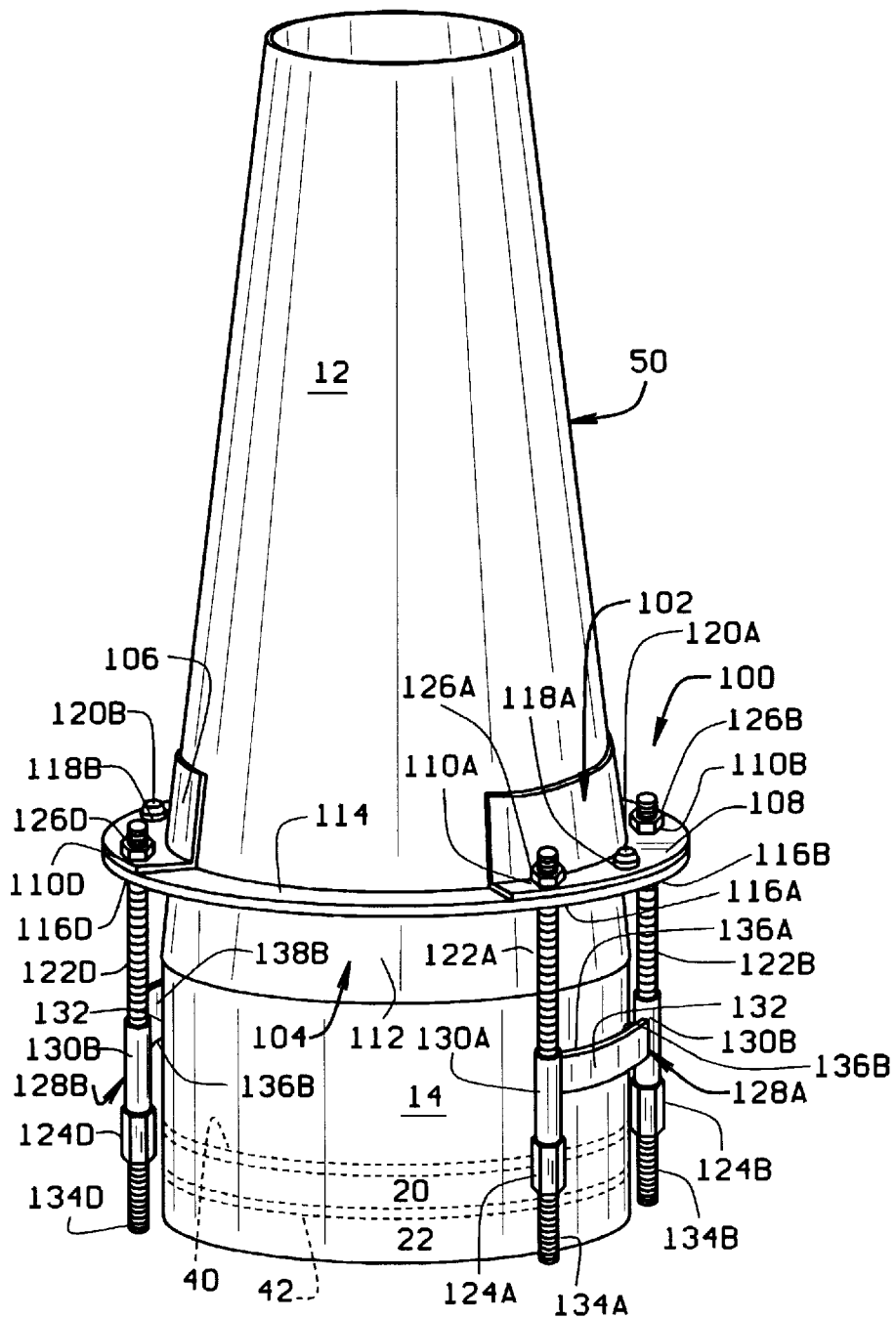
FIG. 3 illustrates a jet pump diffuser having a repair apparatus in accordance with one embodiment of the present invention.

First and second c-rings 102 and 104 are configured so that when they are operatively positioned on diffuser 50 as shown in FIG. 3, openings 110A, 110B, and 110D are substantially aligned with openings 116A, 116B, and 116D.

Figure 4:
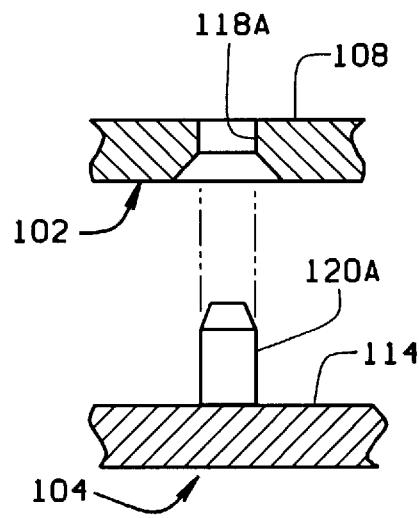
FIG. 4 is an exploded cross sectional view, with parts cut away, of the alignment pin and alignment opening in the lower and upper c-rings, respectively.

First c-ring 102 also has alignment pin openings 118A and 118B formed in planar portion 108, and second c-ring 104 has alignment pins 120A and 120B extending from planar portion 114. Alignment pins 120A and 120B and alignment openings 118A and 118B are positioned so that when first and second c-rings 102 and 104 are operatively positioned as shown in FIG. 3, alignment pins 120A and 120B extend into respective alignment openings 118A and 118B. An exploded view of alignment pin opening 118A and alignment pin 120A is shown in FIG. 4.

Referring again to FIG. 3, when first c-ring 102 and second c-ring 104 are operatively positioned on diffuser 50, the interior surface of first substantially frusto-conical portion 106 of first c-ring 102 is substantially adjacent the exterior surface of conical portion 12 of diffuser 50, and the interior surface of first substantially frusto-conical portion 112 of second c-ring 104 is also substantially adjacent the exterior surface of conical portion 12. Since the slopes of portions 106 and 112 are about equal to the slope of diffuser portion 12, and since the diameter of such portions is selected to about equal the diameter of the lower section of the diffuser 12 at selected contact locations between diffuser 12 and c-rings 102 and 104, an interference or geometric fit is formed between diffuser 50 and c-rings 102 and 104. Typically, such interference or geometric fit is desired to be formed at a lower portion of diffuser 12 adjacent cylindrical portion 14. Further, when first c-ring 102 and second c-ring 104 are operatively positioned as shown in FIG. 3, a surface of substantially planar portion 108 of first c-ring 102 is in substantial surface to surface contact with a surface of substantially planar portion 114 of second c-ring 104.

Repair assembly 100 further includes threaded holdown studs, three shown as, 122A, 122B, and 122D and threaded couplings, three shown as, 124A, 124B, and 124D. Holdown studs 122A, 122B, and 122D extend through aligned openings 110A/116A, 110B/116B, and 110D/116D in c-rings 102 and 104, and threaded nuts 126A, 126B, and 126D are threadedly engaged to respective threaded studs 122A, 122B, and 122D as shown in FIG. 3. Assembly 100 also includes lateral support brackets 128A and 128B, and each bracket 128A and 128B has first and second substantially cylindrical guide pipes 130A and 130B and a segmented circular plate 132. Each guide pipe 130A and 130B has one end adjacent a respective threaded coupling 124A, 124B, and 124D and a respective holdown stud 122A, 122B, and 122D extends therethrough and into threaded engagement with a respective threaded coupling 124A, 124B, and 124D.

Welded studs 134A, 134B, and 134D are each welded at one end to the shroud support plate 32 (see FIG. 1). At the ends opposite the shroud support plate, welded studs 134A, 134B, and 134D are threadedly engaged to threaded couplings 124A, 124B, and 124D.

Each segmented circular plate 132 has a first and a second wedge block 136A and 136B at opposite ends thereof. Wedges 138A and 138B extend from and between the exterior surface of diffuser cylindrical portion 14 and wedge blocks 136A and 136B. Blocks 136A and 136B each have a tapered surface which corresponds to a wedge contact surface of respective wedges 138A and 138B, and blocks 136A and 136B also have guides which force wedges 138A and 138B to slide along the wedge contact face but keep wedges 138A and 138B from disassembling from blocks 136A and 136B.

To retain the stability of lateral support brackets 128A and 128B, and the overall preload of repair assembly 100, Tinel nickel-titanium alloy rings (not shown) may be installed at the top end of guide pipes 130A and 130B against the holdown studs 122A, 122B, and 122D to retain lateral support brackets 128A and 128B in the vertical direction, and on nuts 126A, 126B, and 126D against the upper end of holdown stud 122A, 122B, and 122D. Tinel nickel-titanium alloy rings are commercially available from, for example, Intrinsic Devices, 2353 3$^{RD}$ Street, San Francisco, Calif. 94107 and are not constructed from stainless steel.

To install apparatus 100, and in accordance with one method for repairing one or a combination of welds 40, 42 and/or 44 (see FIGS. 1 and 2), welded studs 134A, 134B, and 134D are welded to the shroud support plate. To perform such welding it may be preferable to mechanically clean the surface of the shroud support plate prior to welding, to use a weld caisson to provide a dry environment for welding, and to use Argon shield welding plus high welding current to achieve a complete weld fusion under water. Without Argon-shielding, large voids and uneven fillet weld spots may develop. Also, a template having stud openings may be used to accurately locate the studs on the shroud support plate and to avoid slippage. Threaded couplings 124A, 124B, and 124D are then threadedly engaged to welded studs 134A, 134B, and 134D.

Figure 5:
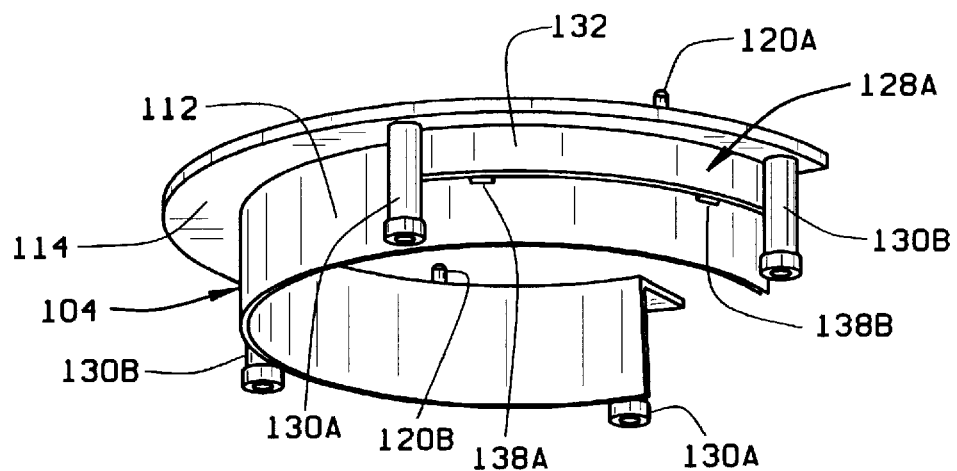
FIG. 5 is a perspective view of the lower c-ring and lateral support bracket.

For a typical jet pump assembly including diffuser 10 or 50, the most reasonable path to bring assembly 100 into the installation area typically is through an access clearance between two adjacent jet pumps. For simplification, bottom c-ring 104 may be pre-assembled with two corresponding lateral support brackets 128A and 128B as shown in FIG. 5. Lower c-ring 104 and lateral support brackets 128A and 128B may be positioned as shown in FIG. 5 using removable clamps. Wedges 138A and 138B may be pinned to brackets 128A and 128B using through holes machined in wedges 138A and 138B to provide access clearance between wedges 138A and 138B and adapter assembly 18. Wedges 138A and 138B are held in the "up" position by the pins to provide clearance, and when the pins are removed, wedges 138A and 138B slide down the guides and make contact with diffuser 50.

Lower c-ring 104 and brackets 128A and 128B, assembled as shown in FIG. 5, are positioned between the jet pumps and then lowered to the installation elevation so that conical portion 112 is in contact with diffuser conical portion 12. Upper c-ring 102 is then positioned between the jet pumps, using the same path as used for lower c-ring 104, and lowered to a location adjacent lower c-ring 104. Upper c-ring 102 is then rotated until alignment openings 118A and 118B align with alignment pins 120A and 120B.

Holdown studs 122A, 122B, and 122D are then inserted through respective aligned openings 110A/116A, 110B/116B, and 110D/116D, through respective lateral support guide pipes 130A, 130B, and 130D, and into threaded engagement with respective threaded couplings 124A, 124B, and 124D. Holdown studs 122A, 122B, and 122D are "preloaded" by threadedly engaging such studs to a desired depth within threaded couplings 124A, 124B, and 124D.

The pins maintaining wedges 138A and 138B in the pre-installation position may then removed and wedges 138A and 138B drop vertically downward and into contact with the surface of adapter 18. The block guides, as hereinbefore explained, control movement of wedges 138A and 138B as they drop into contact with adapter 18. The contact surfaces of wedges 138A and 138B are configured to maximize the contact area with adapter 18, and friction forces and gravity forces maintain wedges 138A and 138B in place during plant operation. The tinel rings may then be secured on guide pipes 130A and 130B as hereinbefore described. Nuts 126A, 126B, and 126D are then threadedly engages to holdown studs 122A, 122B, and 122D, and Tinel nickel-titanium alloy rings may be secured to such nuts 126A, 126B, and 126D to complete assembly.

Although the present methods and apparatus are described above in connection with specific jet pump diffuser configurations, it should be understood that such methods and apparatus can be utilized in connection with many other diffusers in many different configurations, including both boiling water nuclear reactors and pressurized water nuclear reactors. The specific diffuser and adapter assembly descriptions set forth herein are provided merely as examples of diffusers and adapter assemblies which may be repaired utilizing the present methods and apparatus.

In the event that crack indications are ever found in such a weld, repair assembly 100 described above can be utilized to locally retain the region of the crack to provide the support necessary to maintain the diffuser 12 and adapter assembly 18 secure during operation of the reactor, including accident events. Such repair assembly 100, for example, provides both vertical and horizontal support even for a complete circumferential crack in the weld joint. In addition, repair assembly 100 may be installed, as described above, without having to remove any components of the jet pump, e.g., the inlet mixer. Such installation reduces the costs and time required to implement the repair.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A repair assembly for repairing a jet pump diffuser in a nuclear reactor, the diffuser having a substantially conical shape portion, the larger diameter end of the diffuser being welded to one end of an adapter assembly, the other end of the adapter assembly being welded to a shroud support plate of the reactor, said repair assembly comprising:

a first c-ring having a first frusto-conical portion and a second substantially planar portion, a plane extending parallel to the surface of said second portion being substantially perpendicular to the center axis of the c-ring and the slope of the first frusto-conical portion configured to be approximately equal to the slope of the conical shape portion of the diffuser, first and second openings being formed in respective end portions of said first c-ring;

a second c-ring having a first frusto-conical portion and a second substantially planar portion, a plane extending parallel to the surface of said second portion being substantially perpendicular to the center axis of the c-ring and the slope of the first frusto-conical portion configured to be approximately equal to the slope of the conical shape portion of the diffuser, first and second openings being formed in respective end portions of said second c-ring; and a lateral support bracket;

said first and second c-rings configured so that when said first and second c-rings are operatively positioned at a location on the diffuser, said first and second openings of said first c-ring are substantially aligned with the said first and second openings of said second c-ring, respectively.

2. A repair assembly in accordance with claim 1 wherein said first c-ring has at least one alignment pin and second c-ring has at least on alignment opening, said alignment pin and said alignment opening positioned so that when the first an second c-rings are operatively positioned, said alignment pin extends into said alignment opening.

3. A repair assembly in accordance with claim 1 wherein when said first c-ring and said second c-ring are operatively positioned, an interior surface of said first substantially frusto-conical portion of said first c-ring is substantially adjacent a first portion of an exterior surface of the diffuser, and an interior surface of said first substantially frusto-conical portion of said second c-ring is substantially adjacent a second portion of an exterior surface of the diffuser.

4. A repair assembly in accordance with claim 3 wherein when said first c-ring and said second c-ring are operatively positioned, a surface of said substantially planar portion of said first c-ring is in substantial surface to surface contact with a surface of said substantially planar portion of said second c-ring.

5. A repair assembly in accordance with claim 1 further comprising at least a first holdown stud and at least a first threaded coupling, said first holdown stud configured to extend from and through aligned openings in said first and second c-rings into engagement with said first threaded coupling.

6. A repair assembly in accordance with claim 5 comprising a third opening formed in said first c-ring and spaced from said first opening therein, a third opening formed in said second c-ring and spaced from said first opening therein, and at least a second holdown stud and a second threaded coupling, said second holdown stud configured to extend from and through said aligned third openings in said first and second c-rings into engagement with said second threaded coupling.

7. A repair assembly in accordance with claim 6 wherein said lateral support bracket comprises first and second substantially cylindrical guide pipes, said first guide pipe configured to have one end adjacent said first threaded coupling and to have said first holdown stud extend therethrough, said second guide pipe configured to have one end adjacent said second threaded coupling and to have said second holdown stud extend therethrough, and a segmented circular plate engaged at respective ends to said first and second guide pipes, respectively.

8. A repair assembly in accordance with claim 7 further comprising a first welded stud and a second welded stud, said first and second welded studs configured to be welded to the shroud support plate, said first and second welded studs configured to be engaged to said first and second threaded couplings, respectively.

9. A repair assembly in accordance with claim 7 wherein said circular plate has a first and a second wedge block at opposite ends thereof, said wedge blocks being configured to be engaged to wedges which extend from and between the diffuser and said wedge blocks.

* * * * *